United States Patent
Yeh et al.

(10) Patent No.: US 10,254,467 B2
(45) Date of Patent: Apr. 9, 2019

(54) BACKLIGHT STRUCTURE

(71) Applicant: Primax Electronics Ltd., Taipei (TW)

(72) Inventors: Tien-Yu Yeh, Taipei (TW); Che-Wei Yang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/676,200

(22) Filed: Aug. 14, 2017

(65) Prior Publication Data
US 2018/0267231 A1    Sep. 20, 2018

(30) Foreign Application Priority Data
Mar. 17, 2017    (TW) .............................. 106108941 A

(51) Int. Cl.
  *F21V 8/00*    (2006.01)
(52) U.S. Cl.
  CPC .......... *G02B 6/0073* (2013.01); *G02B 6/0055* (2013.01)
(58) Field of Classification Search
  CPC .. G02B 6/0021; G02B 6/0091; G02B 6/0055; G02B 6/0068; G02B 6/0073; G02B 6/0026; G02B 6/0031; G02B 5/207; G02B 6/002; G02B 6/0056
  See application file for complete search history.

(56) References Cited

U.S. PATENT DOCUMENTS

| | | | |
|---|---|---|---|
| 6,601,962 B1 * | 8/2003 | Ehara ................... | G02B 6/0016 362/558 |
| 2006/0044827 A1 * | 3/2006 | Sugiura ................ | G02B 6/0028 362/611 |
| 2016/0187559 A1 * | 6/2016 | Li ........................ | G02B 6/0021 362/609 |
| 2018/0106946 A1 * | 4/2018 | Fan ........................ | G02B 5/207 |

* cited by examiner

*Primary Examiner* — Anh T Mai
*Assistant Examiner* — Fatima N Farokhrooz
(74) *Attorney, Agent, or Firm* — Kirton McConkie; Evan R. Witt

(57) ABSTRACT

The present invention provides a backlight structure, including: a light source module having a first slant surface, where a slot is provided on the first slant surface, and the slot is configured to accommodate a light emitting element; a light guiding module having a light guiding plate and a light shielding layer, where a second slant surface is provided at a side of the light guiding module; and a baseplate configured to bear the light guiding module and the light source module. The light source module is engaged with the second slant surface of the light guiding module by means of the first slant surface.

8 Claims, 2 Drawing Sheets

BACKLIGHT STRUCTURE

FIELD OF THE INVENTION

The present invention relates to a light source structure, and in particular, to a backlight structure having a light emitting diode or an electro luminescence module.

BACKGROUND OF THE INVENTION

A light emitting diode was first invented in 1965, and was a red light emitting diode (LED) that uses a gallium arsenide (GaAs) material as a laminate. However, the light emitting efficiency (the luminous flux) of the light emitting diode is only about 0.1 lumens per watt. The LED packaging technology and light emitting efficiency are improved, followed by invention of an LED having a small volume, low power consumption, a long service life, and a rapid operation response. Due to increase in the energy-saving and carbon-reducing requirement and environmental awareness, in countries around the world, the conventional tungsten lamps or mercury lamps have been gradually replaced by the LEDs. Currently, LEDs are widely used as backlight light sources for signal lamps, advertising lamps, light sources for automobiles, outdoor lighting apparatuses or household lighting apparatuses, or electronic products such as displays and computer peripheral apparatuses.

In the prior art, light leakage usually occurs in a backlight module of an electronic product because it is impossible to engage an LED with a light guiding plate to form a closed structure in an assembly process thereof. To resolve the problem of light leakage, electronics manufacturers start to develop and design various backlight modules. For example, in Chinese Patent No. CN101922662A, a backlight structure in which an LED is slant-wise disposed in a support frame is provided. The LED is slant-wise disposed, so that a light emergent surface thereof is not higher than a light guiding plate, thereby lowering the light leakage probability. However, in the technical solutions of the foregoing patent, the LED needs to be slant-wise disposed, and the light emergent surface of the LED needs to be abutted against and aligned with a light incident surface of the light guiding plate. Consequently, the assembly process is relatively complex, and light leakage may still occur if the LED is not correctly positioned during the assembly process.

Therefore, the present invention is intended for resolving the technical problem of how to simplify an assembly process of a backlight module and effectively lowering the light leakage probability.

SUMMARY OF THE INVENTION

A primary objective of the present invention is to provide a backlight structure that prevents light leakage and is convenient for assembly.

To achieve the foregoing objective, the present invention provides a backlight structure, including:
  a light source module, having a first slant surface, where a slot is provided on the first slant surface, and the slot is configured to accommodate a light emitting element;
  a light guiding module, having a light guiding plate and a light shielding layer, where a second slant surface is provided at a side of the light guiding module; and
  a baseplate, configured to bear the light source module and the light guiding module, where
  the light source module is engaged with the second slant surface of the light guiding module by means of the first slant surface.

In the foregoing preferred implementation manner, the light guiding module further includes a reflecting layer, where the reflecting layer is configured to reflect a light ray generated by the light source module.

In the foregoing preferred implementation manner, the light source module is a light emitting diode module, and the light emitting element is a light emitting diode wafer.

In the foregoing preferred implementation manner, the light source module is an electro luminescence module, and the light emitting element is an electro luminescence wafer.

In the foregoing preferred implementation manner, the included angle between the first slant surface and a bottom surface of the light source module is less than 90 degrees.

In the foregoing preferred implementation manner, the included angle between the second slant surface and a bottom surface of the light guiding module is greater than 90 degrees.

In the foregoing preferred implementation manner, the included angle between the first slant surface and a bottom surface of the light source module is greater than 90 degrees.

In the foregoing preferred implementation manner, the included angle between the second slant surface and a bottom surface of the light guiding module is less than 90 degrees.

DETAILED DESCRIPTION OF THE PREFERRED EMBODIMENT

More detailed descriptions are made with reference to the examples of the embodiments and the accompanying drawings, to make advantages and features of the present invention and the method to implement the present invention easier to understand. However, the present invention may be implemented in different forms and it should not be understood that the present invention can be implemented only by using the embodiments described herein. On the contrary, for those ordinarily skilled in the art, the provided embodiments will make the disclosure more apparent and comprehensive and completely convey the scope of the present invention.

Figure 1A:
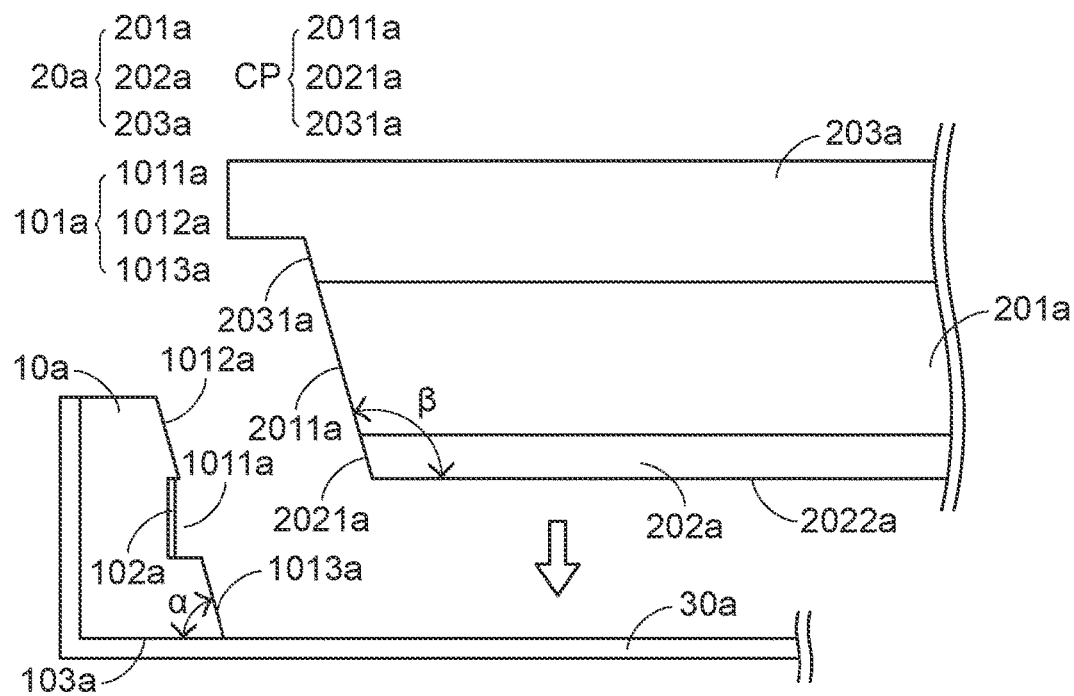
FIG. 1A and FIG. 1B illustrate a backlight structure according to a first embodiment of the present invention.
Figure 1B:
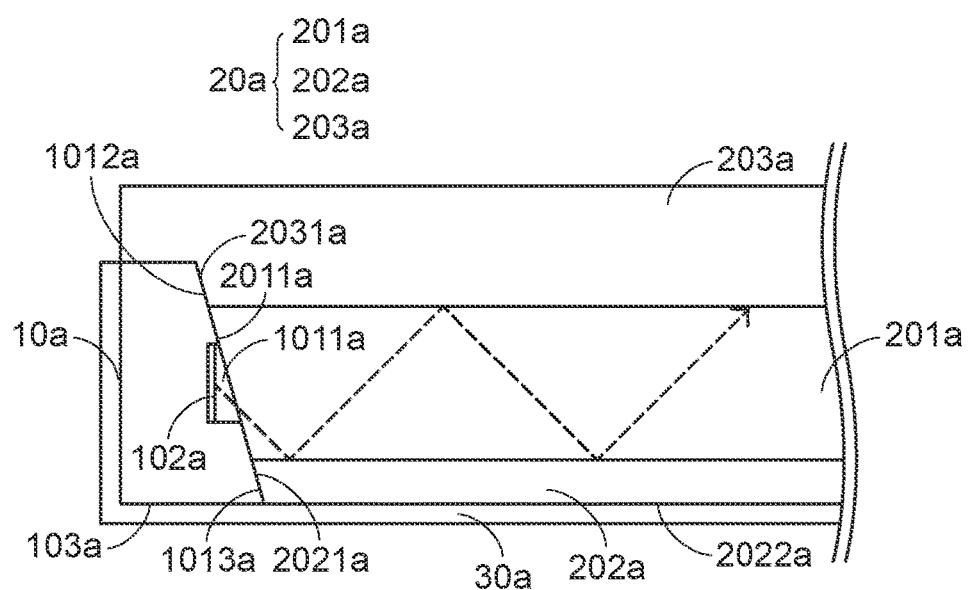

First, referring to FIG. 1A and FIG. 1B, FIG. 1A and FIG. 1B illustrate a backlight structure according to a first embodiment of the present invention. In FIG. 1A, the backlight structure includes: a light source module 10a, a light guiding module 20a, and a baseplate 30a.

First, the light source module 10a is disposed on the baseplate 30a. The light source module 10a has a first slant surface 101a and a bottom surface 103a. A slot 1011a is provided on the first slant surface 101a. The slot 1011a divides the first slant surface 101a into an upper guiding angle slant surface 1012a and a lower guiding angle slant surface 1013a. The slot 1011a is configured to accommodate a light emitting element 102a. The light source module 10a is a light emitting diode module or an electro luminescence (Electro Luminescence, EL) module. The light emitting element 102a is a light emitting diode wafer or an electro luminescence wafer. The included angle α between the first slant surface 101a and a bottom surface 103a of the light source module 10a is less than 90 degrees.

Still referring to FIG. 1A, then, the light guiding module 20a is disposed at a side of the light source module 10a. The light guiding module 20a has a light guiding plate 201a, a reflecting layer 202a disposed at the bottom of the light guiding plate 201a, and a light shielding layer 203a disposed at the top of the light guiding plate 201a. A second slant surface CP is provided at a side of the light guiding module 20a, and constructed by a slant surface 2031a of the light shielding layer 203a, a slant light incident surface 2011a of the light guiding plate 201a, and a slant surface 2021a of the reflecting layer 202a that are coplanar. The included angle β between the second slant surface CP and a bottom surface 2022a of the light guiding module 20a is greater than 90 degrees. The sum of the included angle β of the light guiding module 20a and the included angle α of the light source module 10a is equal to 180 degrees. The included angle β of the light guiding module 20a and the included angle α of the light source module 10a are supplementary to each other. Therefore, in an assembly process, the light source module 10a may be engaged with the second slant surface CP of the light guiding module 20a by means of the first slant surface 101a to form a closed structure. The light shielding layer 203a according to the present invention may be a film made of a flexible material such as polycarbonate (PC), polyethylene terephthalate (PET), or a polyester film (MYLAR), and white printing ink having high reflecting performance or black printing ink having high absorbing performance (not shown) may be coated or may be printed on a surface of the film, to improve light shielding efficiency of the light shielding layer 203a. The reflecting layer 202a may be a film made of a flexible material such as polycarbonate, polyethylene terephthalate, or a polyester film, and white printing ink having high reflecting performance (not shown) may be coated or may be printed on a surface of the film, or multiple micro structures (not shown) are formed on the surface of the film, to improve light ray reflecting efficiency of the reflecting layer 202a. The light guiding plate 201a is made of a material having high refractivity such as polycarbonate or polymethyl methacrylate (PMMA), and white printing ink having high reflecting performance (not shown) may be coated or may be printed on a surface of the light guiding plate 201a, or multiple micro structures (not shown) are formed on the surface of or inside the light guiding plate 201a, to improve light ray penetrating efficiency of the light guiding plate 201a.

Referring to FIG. 1B, when the light source module 10a is engaged with the light guiding module 20a, the light shielding layer 203a covers the top of the light source module 10a, and an upper guiding angle slant surface 1012a of the light source module 10a closely adjoins the slant surface 2031a of the light shielding layer 203a and the slant light incident surface 2011a of the light guiding plate 201a, to form a closed structure having no slit; and a lower guiding angle slant surface 1013a of the light source module 10a closely adjoins the slant light incident surface 2011a of the light guiding plate 201a and the slant surface 2021a of the reflecting layer 202a, to form a closed structure having no slit. The light source module 10a can be engaged with the light guiding module 20a to from a closed structure having no slit, and therefore, the light emitting element 102a does not need to be abutted against the light guiding plate 201a or a light emergent direction of the light emitting element 102a does not need to be changed. When a light ray generated by the light emitting element 102a enters the light guiding plate 201a from the slant light incident surface 2011a, there is not light leakage, and the slant light incident surface 2011a increases the area of the light incident surface for receiving light, thereby effectively improving luminosity of the backlight structure.

Figure 2A:
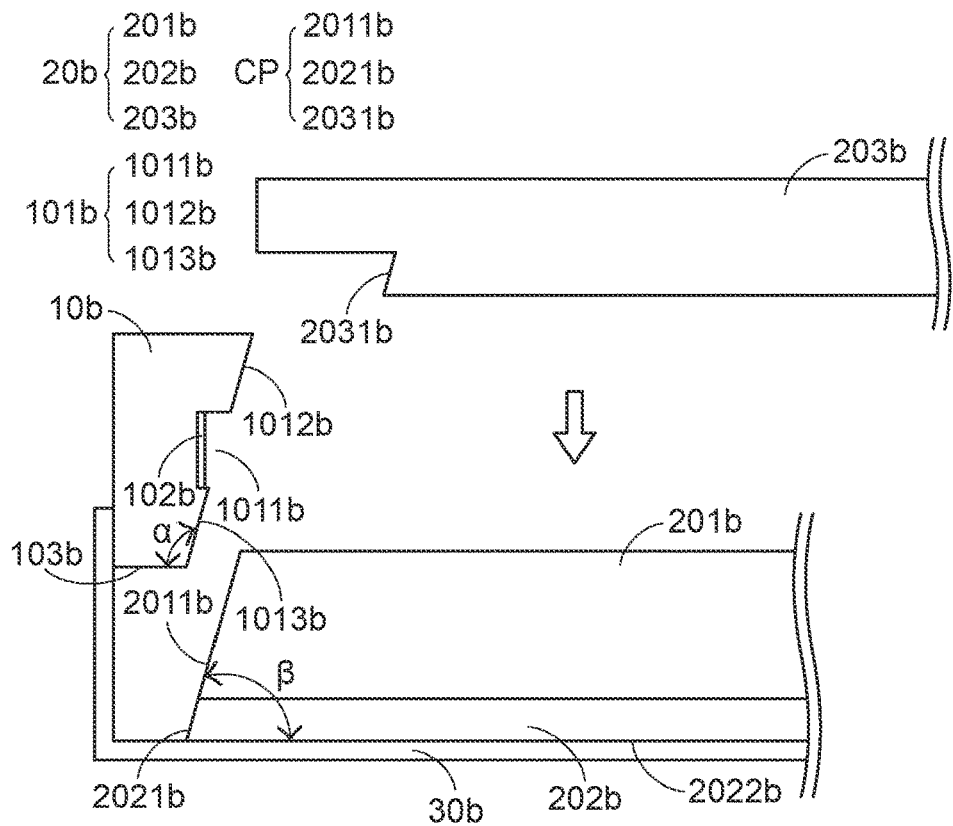
FIG. 2A and FIG. 2B illustrate a backlight structure according to a second embodiment of the present invention.
Figure 2B:
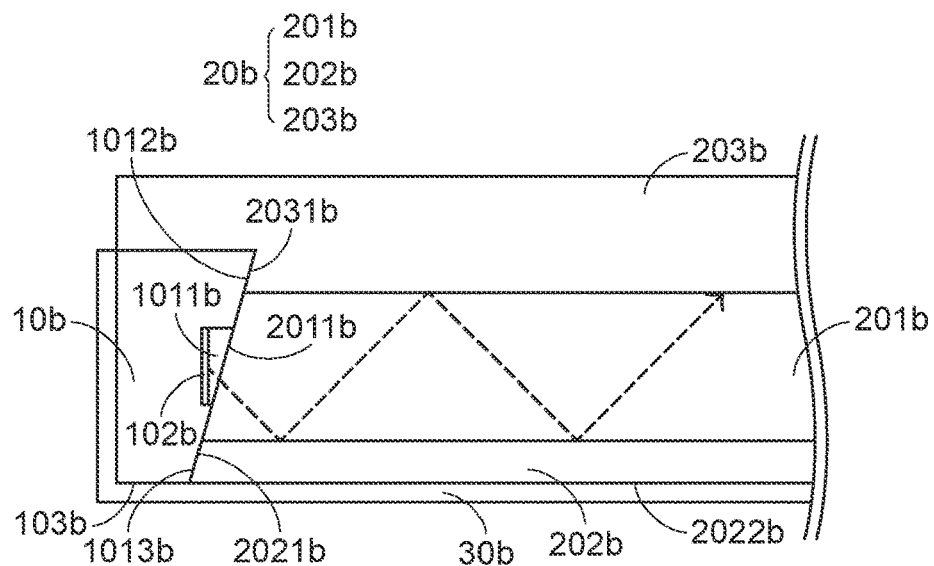

Still referring to FIG. 2A and FIG. 2B, FIG. 2A and FIG. 2B illustrate a backlight structure according to a second embodiment of the present invention. As shown in FIG. 2A, elements of a light source module 10b, a light guiding module 20b, and a baseplate 30b of the backlight structure have the same functions as those of the elements of the light source module 10a, the light guiding module 20a, and the baseplate 30a shown in FIG. 1A, and details are not described herein again. The only difference is that the included angle α between a first slant surface 101b of the light source module 10b and a bottom surface 103b of the light source module 10b is greater than 90 degrees, and the included angle β between a second slant surface CP constructed by a slant surface 2031b of a light shielding layer 203b, a slant light incident surface 2011b of a light guiding plate 201b, and a slant surface 2021b of a reflecting layer 202b that are coplanar, and a bottom surface 2022b of the light guiding module 20b is less than 90 degrees. The included angle β of the light guiding module 20b is less than 90 degrees. Therefore, during an assembly process, first, the reflecting layer 202b and the light guiding plate 201b of the light guiding module 20b are disposed on the baseplate 30b; then, the light source module 10b is disposed at a side of the reflecting layer 202b and the light guiding plate 201b; and finally, the light shielding layer 203b is disposed and covers the top of the light source module 10b and the light guiding plate 201b. The sum of the included angle β of the light guiding module 20b and the included angle α of the light source module 10b is equal to 180 degrees. Therefore, the light source module 10b may be engaged with the second slant surface CP of the light guiding module 20b by means of the first slant surface 101b to form a closed structure shown in FIG. 2B.

Compared with the conventional technology, in the present invention, the light source module and the light guiding module have slant surfaces of which included angles are supplementary, so that the light source module and the light guiding module can form a closed structure having no slit, thereby effectively avoiding light leakage. In addition, by means of the design of the slant surface, luminance of the backlight light source can be improved, and the light source module and the light guiding module can be assembled more easily, thereby simplifying an assembly process of a backlight structure to improve assembly efficiency. Therefore, the present invention is an invention of high industrial value.

Any modification made to the present invention by persons skilled in the art by means of technical measures shall fall within the protection scope of the present invention.

What is claimed is:

1. A backlight structure, comprising:
   a light source module, having a first slant surface, wherein a slot is provided on the first slant surface, and the slot is configured to accommodate a light emitting element, wherein the slot divides the first slant surface into an upper guiding angle slant surface and a lower guiding angle slant surface;
   a light guiding module, having a light guiding plate, a light shielding layer, and a reflecting layer, wherein a second slant surface is provided at a side of the light guiding module, and wherein the second slant surface is constructed by a slant surface of the light shielding layer, a slant light incident surface of the light guiding plate, and a slant surface of the reflecting layer; and a baseplate, configured to bear the light source module and the light guiding module, wherein the light source module is engaged with the second slant surface of the light guiding module by means of the first slant surface and wherein the light shielding layer covers the top of the light source module, and the upper guiding angle slant surface of the light source module closely adjoins the slant surface of the light shielding layer and the slant light incident surface of the light guiding plate to form a closed structure having no slit, and wherein the lower guiding angle slant surface of the light source module closely adjoins the slant light incident surface of the light guiding plate and the slant surface of the reflecting layer to form a closed structure having no slit.

2. The backlight structure according to claim 1, wherein the reflecting layer is configured to reflect a light ray generated by the light source module.

3. The backlight structure according to claim 1, wherein the light source module is a light emitting diode module, and the light emitting element is a light emitting diode wafer.

4. The backlight structure according to claim 1, wherein the light source module is an electro luminescence module, and the light emitting element is an electro luminescence wafer.

5. The backlight structure according to claim 1, wherein the included angle between the first slant surface and a bottom surface of the light source module is less than 90 degrees.

6. The backlight structure according to claim 1, wherein the included angle between the first slant surface and a bottom surface of the light source module is greater than 90 degrees.

7. The backlight structure according to claim 5, wherein the included angle between the second slant surface and a bottom surface of the light guiding module is greater than 90 degrees.

8. The backlight structure according to claim 6, wherein the included angle between the second slant surface and a bottom surface of the light guiding module is less than 90 degrees.

* * * * *